United States Patent
Tavares et al.

(10) Patent No.: US 9,447,705 B2
(45) Date of Patent: Sep. 20, 2016

(54) METHOD TO MAXIMIZE ENERGY RECOVERY IN WASTE-TO-ENERGY PROCESS

(75) Inventors: Jason Robert Tavares, Longueuil (CA); Pierre Carabin, Montreal (CA)

(73) Assignee: PYROGENESIS CANADA INC., Montreal, Quebec (CA)

( * ) Notice: Subject to any disclaimer, the term of this patent is extended or adjusted under 35 U.S.C. 154(b) by 236 days.

(21) Appl. No.: 14/005,546

(22) PCT Filed: Mar. 14, 2012

(86) PCT No.: PCT/CA2012/000233
§ 371 (c)(1),
(2), (4) Date: Nov. 18, 2013

(87) PCT Pub. No.: WO2012/122631
PCT Pub. Date: Sep. 20, 2012

(65) Prior Publication Data
US 2014/0075944 A1     Mar. 20, 2014

Related U.S. Application Data

(60) Provisional application No. 61/452,501, filed on Mar. 14, 2011.

(51) Int. Cl.
*F01K 25/08*   (2006.01)
*F01K 13/02*   (2006.01)
*F23G 5/16*    (2006.01)
*F23G 5/46*    (2006.01)

(52) U.S. Cl.
CPC .............. *F01K 25/08* (2013.01); *F01K 13/02* (2013.01); *F23G 5/16* (2013.01); *F23G 5/46* (2013.01); *F23G 2206/203* (2013.01); *Y02E 20/12* (2013.01)

(58) Field of Classification Search
CPC .......... F01K 25/08; F01K 13/02; F23G 5/16; F23G 5/46; F23G 2206/203; Y02E 20/12
USPC ................................................... 60/651, 671
See application file for complete search history.

(56) References Cited

U.S. PATENT DOCUMENTS

| | | | |
|---|---|---|---|
| 4,948,485 A * | 8/1990 | Wallsten et al. | 204/164 |
| 6,539,723 B2 * | 4/2003 | Bronicki et al. | 60/774 |
| 7,225,621 B2 | 6/2007 | Zimron et al. | |
| 8,754,001 B2 * | 6/2014 | Paskalov et al. | 502/413 |
| 2007/0272131 A1 * | 11/2007 | Carabin et al. | 110/250 |
| 2009/0320477 A1 | 12/2009 | Juchymenko | |

(Continued)

*Primary Examiner* — Hoang Nguyen
(74) *Attorney, Agent, or Firm* — Shutts & Bowen LLP (57) ABSTRACT

In a fossil fuel waste incineration or plasma gasification process, waste heat generated by combustion of waste is captured by a heat transfer fluid and conveyed to an Organic Rankine Cycle (ORC) for energy recovery. In the case of a fossil fuel-fired waste incineration system, the heat transfer fluid captures waste heat from a double-walled combustion chamber, a heat exchanger being used to cool the hot process exhaust (gas cooler). In the case of a plasma waste gasification system, the heat transfer fluid captures waste heat from a plasma torch, a gasification chamber and combustion chamber cooling jackets as well as any other high-temperature components requiring cooling, and then a heat exchanger used to cool the hot process exhaust (gas cooler). The heat exchanger may take on several configurations, including plate or shell and tube configurations.

20 Claims, 5 Drawing Sheets

(56) References Cited

U.S. PATENT DOCUMENTS

2010/0326076 A1 12/2010 Ast et al.
2012/0097648 A1* 4/2012 Foret .................. 219/121.52
2012/0128560 A1* 5/2012 Krishnamurthy et al. ... 423/226
2013/0174552 A1* 7/2013 Mahmoud et al. ............ 60/671
2013/0312424 A1* 11/2013 Juranitch ...................... 60/780
2013/0318968 A1* 12/2013 Juranitch et al. ............. 60/645

* cited by examiner

METHOD TO MAXIMIZE ENERGY RECOVERY IN WASTE-TO-ENERGY PROCESS

CROSS REFERENCE TO RELATED APPLICATIONS

This Application is a §371 national stage entry of International Application No. PCT/CA2012/000233, filed Mar. 14, 2012, which claims priority on U.S. Provisional Application No. 61/452,501, filed on Mar. 14, 2011, both of which are herein incorporated by reference.

FIELD OF THE INVENTION

The present invention relates to thermal destruction of waste and, more particularly, to recovering energy in the process thereof.

BACKGROUND OF THE INVENTION

Thermal destruction is commonly employed for the destruction of waste, including municipal refuse and industrial waste. Two methods for thermal destruction are plasma gasification (electric) and fossil fuel-fired incineration. In both cases, a high-temperature source is applied, leading either directly to combustion (incineration) or gasification (plasma) followed by combustion. Both methods lead to the formation of an inorganic residue (e.g.: ash, slag) and hot combustion gases. Typical energy recovery efforts focus on extracting heat from the hot exhaust. These efforts can include the use of a boiler to generate steam (the Rankine cycle) or the use of a heat exchanger to generate a hot liquid resource. If the waste being combusted/gasified contains a high level of chlorine (such as when chlorinated plastics are burned), these thermal exchange methods are typically replaced by a rapid liquid quench to prevent the formation of toxic by-products, such as dioxins and furans.

The Rankine cycle is a process by which a fluid, typically water, is cyclically evaporated, expanded through a turbine and condensed. The Rankine cycle is the principle of operation of several common devices, including air conditioning units and refrigerators. This process can also be used to capture the thermal energy generated by a process and convert that energy into mechanical work in a turbine (which can then be converted to electricity using a generator). In typical industrial processes, this is accomplished by generating steam from a hot resource by means of a boiler. However, using a boiler to generate steam from waste heat can be challenging and the application potential is limited to large-scale facilities (this is because the efficiency of the steam cycle increases as the available waste heat load increases). For small-scale waste combustion facilities, such as those that would be installed on marine vessels, the steam cycle is inefficient and impractical. The steam generated would be low to medium pressure, at best. Moreover, there are safety concerns that must be addressed when using a steam cycle, related to the high temperature and pressure conditions of the steam. These concerns can lead to certification difficulties in controlled environments, such as on ships. The steam cycle is also meant to operate on a full design thermal load, given that a steam turbine's turn-down is quite poor: if only part of the thermal load is available to the boiler (such as during startup, shutdown or process fluctuations), lower pressure steam will be generated which may be insufficient to activate the steam turbine. Therefore, the steam cycle's ability to cope with load changes is quite limited.

Rather than convert to electricity using the steam cycle, some opt to use the exhaust's thermal energy to either generate steam for heating purposes, or to yield a hot water resource. Such applications can be useful, depending on the needs of the surrounding processes.

In both cases (generation of steam to yield electricity with a turbine or generation of steam/hot water for use as a process resource), the heat from the exhaust is typically the only thermal energy source considered. However, there is a significant heat load typically lost in other portions of the waste destruction process, particularly for shipboard processes. Indeed, IMO (International Maritime Organization) regulations state that the surface temperature of all shipboard waste destruction components be no more than 60° C. This regulation is typically interpreted as meaning that the process components must be water-cooled down to below 20° C. Such aggressive cooling implies that the cooling water flow rate is high and that the temperature increase of the water is limited to a few degrees. As a result, the cooling water return cannot practically be used as a hot water resource and the thermal energy it contains is wasted. For example, in the case of plasma waste gasification systems, this wasted heat load can represent as much as 20% of the total system energy rating (15% lost to the cooling jackets, 5% lost to the plasma torch). Looking specifically at the plasma torch, up to 35% of the gross power supplied to generate the thermal discharge is wasted as a result of aggressive cooling.

Figure 1:
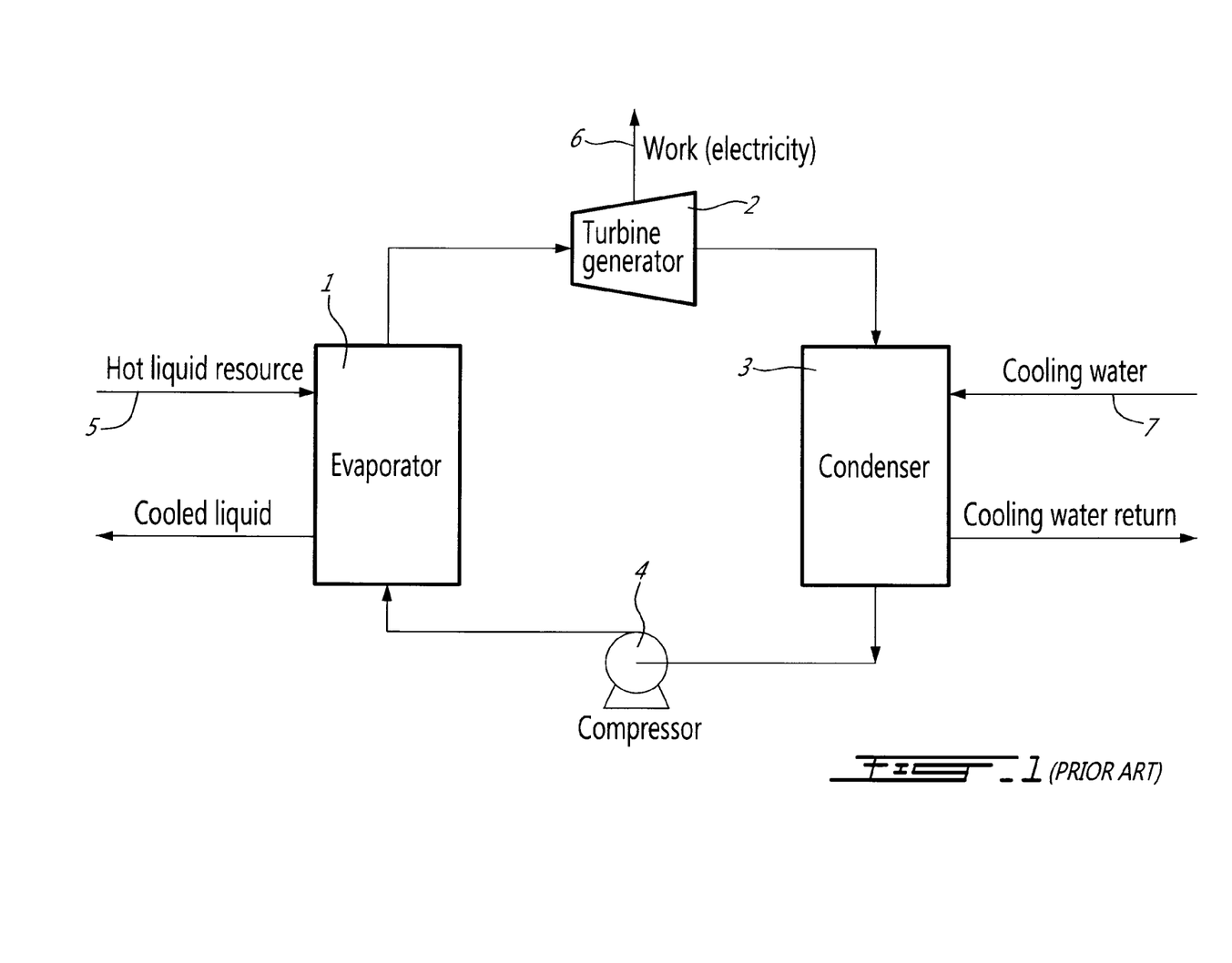
FIG. 1 is a schematic representation of a conventional Organic Rankine Cycle (ORC)

The organic Rankine cycle (ORC) is similar to the traditional Rankine cycle, making use of an organic refrigerant instead of steam to convert thermal energy into electricity. Because of the thermo-physical properties of the refrigerants employed (refrigerant R245fa is typically preferred), the ORC is best suited to recover energy from hot liquid resources with temperatures ranging from 90° C. to 150° C. (as its boiling point is significantly lower than that of water). Much like the regular Rankine cycle, the ORC, schematically illustrated in FIG. 1, is composed of four main parts: an evaporator 1, a turbine generator 2, a condenser 3 and a compressor 4. A hot liquid resource 5 is fed to the evaporator 1 to transfer thermal energy to the refrigerant. The refrigerant evaporates and is conveyed to a turbine generator 2 where it is expanded (the work 6 resulting from this expansion in the turbine is converted to electricity by the generator). The expanded refrigerant is condensed in a second heat exchanger (the condenser 3), through indirect contact with cooling water 7. The compressor 4 then pressurizes the condensed refrigerant and the cycle repeats. The efficiency (portion of the thermal load converted into electricity) for the ORC is in the order of 10%. Commercial ORC units are available from several manufacturers.

Therefore, there is a need in the art for improved technology for the recovery of energy in thermal waste destruction systems.

SUMMARY OF THE INVENTION

It is therefore an aim of the present invention to provide a novel system for recovering energy in thermal waste destruction systems.

Therefore, in accordance with the present invention, there is provided a fossil fuel waste incineration or plasma gasification process, wherein waste heat generated by a combustion of waste is captured by a heat transfer fluid and conveyed to an Organic Rankine Cycle (ORC) for energy recovery.

Also in accordance with the present invention, there is provided a method for operating a waste destruction system at a higher shell temperature to allow for the generation of a useful hot liquid resource, using high temperature polymeric material in plasma torch components and insulation of the hot components of the system.

Further in accordance with the present invention, there is provided a method, wherein waste thermal energy in a fossil fuel waste incineration or plasma gasification process is recovered by cooling of the various thermal components with a liquid and by using the liquid to quench the hot process exhaust, energy being recovered from the heated liquid following a filtration step to remove any entrapped ash.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which.

DESCRIPTION OF ILLUSTRATIVE
EMBODIMENTS OF THE INVENTION

In order to address the issue of waste thermal energy in waste destruction systems, a method by which the majority of the waste heat is captured by a heat transfer fluid and conveyed to the ORC for energy recovery is hereby presented.

Figure 2:
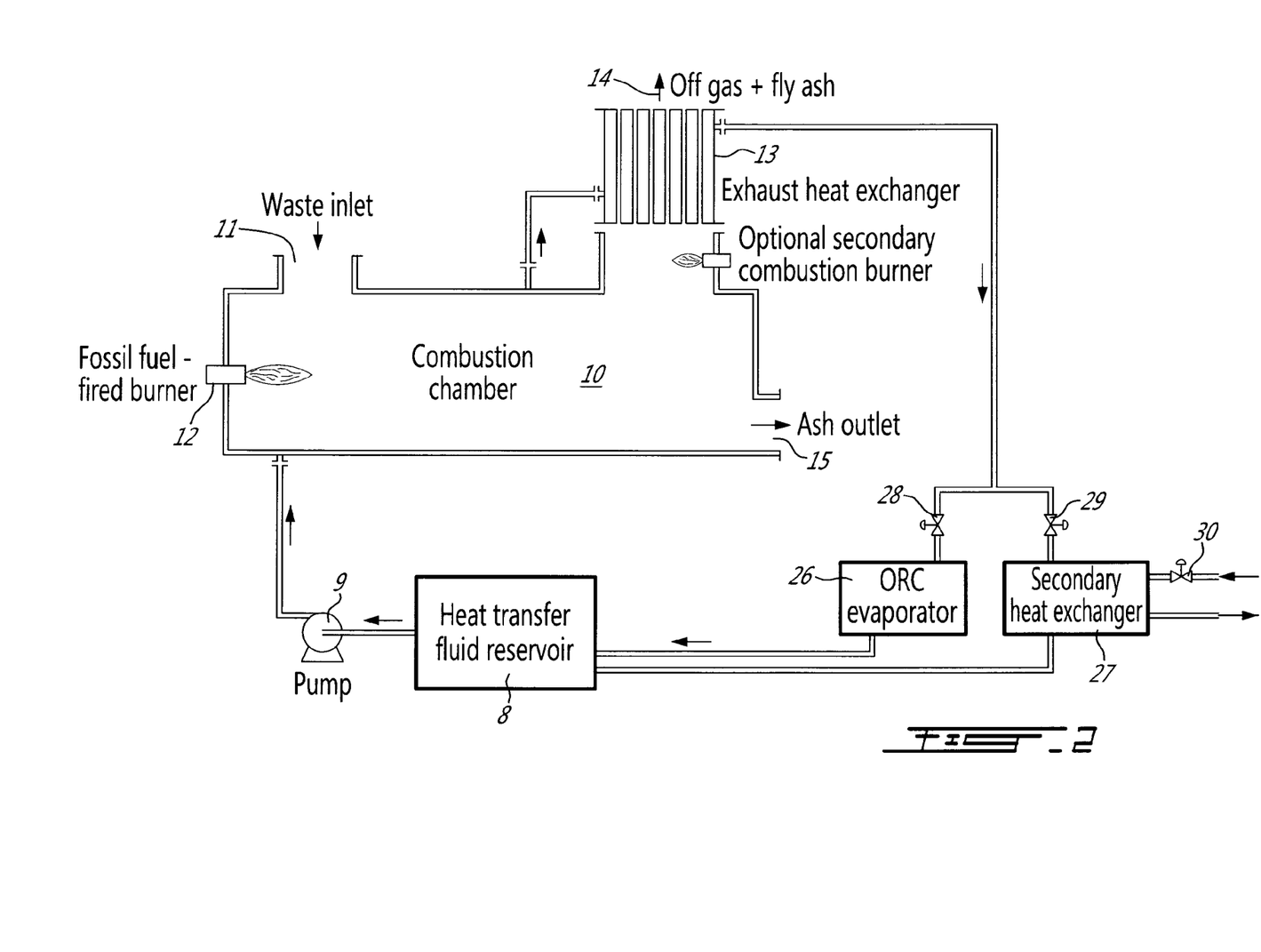
FIG. 2 is a schematic representation of a process in accordance with the present invention, as applied to a fossil fuel-fired incineration system.

In the case of a fossil fuel-fired incineration system, as illustrated in FIG. 2, the heat transfer fluid would be first conveyed from a reservoir 8 using a pump 9 and fed to a combustion chamber 10 (double-walled chamber for cooling). Waste 11 is introduced to the combustion chamber 10 and incinerated by means of a fossil fuel-fired burner 12. The heat transfer fluid is conveyed from the combustion chamber 10 cooling jacket to a heat exchanger 13 used to cool the hot process exhaust. The heat exchanger 13 used to recover the exhaust heat may take on several configurations, including plate or shell and tube configurations. Given an exhaust 14 from a waste combustion process typically has a significant ash content 14, 15, the shell and tube "fire-tube" configuration is preferred to minimize fouling.

Figure 3:
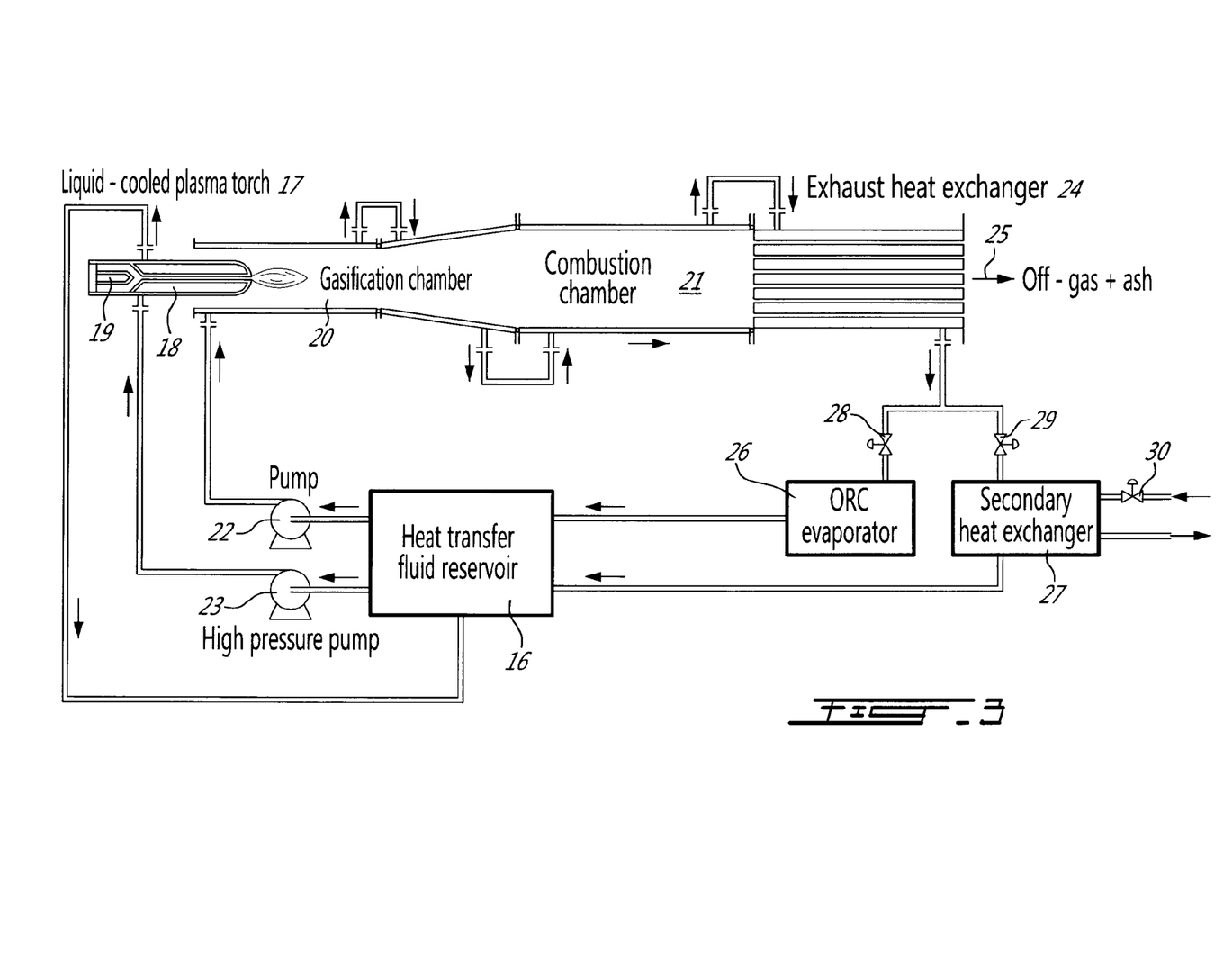
FIG. 3 is a schematic representation of a process in accordance with the present invention, as applied to a plasma waste gasification system.

In the case of a plasma waste gasification system, as illustrated in FIG. 3, the heat transfer fluid would first be fed from a reservoir 16 to a plasma torch 17 cooling channels (both in the anode cooling channels 18 and the cathode cooling channel 19) using a pump 22. The fluid is subsequently fed to the gasification chamber 20 and the combustion chamber 21 cooling jackets (as well as any other high-temperature component requiring cooling). Given that plasma torches typically require the cooling fluid used to be at high pressure (upwards of 200 psig), a separate high-pressure pumping system 23 may in some instances be used to convey the heat transfer fluid to the torch 17 at high pressure and then return the heated liquid to the reservoir 16 from which it was pumped. A second, lower-pressure pump 22 can then be employed to convey the preheated fluid from said reservoir 16 to the gasification chamber 20 and combustion chamber 21 cooling channels and, then, to the exhaust heat exchanger 24. The cooled offgas exits the system at 25.

In both cases (incineration and plasma gasification systems), the heated fluid exits the exhaust heat exchanger and is fed to the ORC evaporator 26. The thermal energy it carries is transferred to the refrigerant for conversion into electricity. The heat transfer fluid returns, cooled, to the reservoir 8, 16 from which it was initially pumped.

Figure 4:
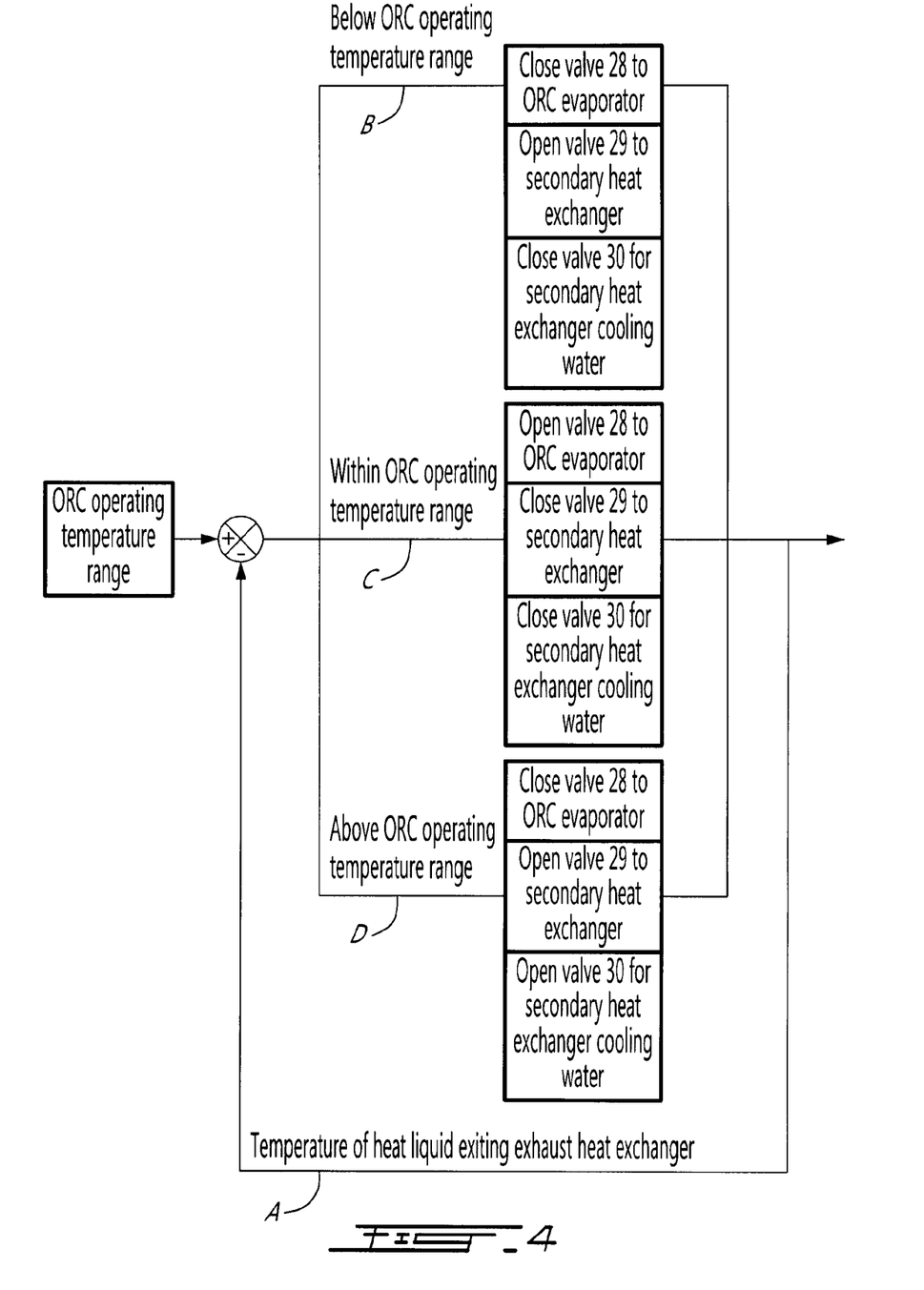
FIG. 4 is a block diagram of a system control philosophy in accordance with the present invention.

In both cases (incineration and plasma gasification systems), the heated fluid can be alternatively fed to a separate, secondary heat exchanger 27 until the appropriate temperature has been reached for proper operation of the ORC (ORC units do, however, have a much larger operating window compared to steam Rankine cycles—better turn-down capabilities). This separate heat exchanger 27 may also be used in case of malfunction in the ORC unit or in case of a process temperature excursion (if the heated fluid temperature exceeds the design parameters of the ORC). The general control philosophy of the system is illustrated in FIG. 4. Specifically, the control philosophy involves monitoring the temperature A of the heat transfer fluid exiting the exhaust heat exchanger 13, 24. If the temperature A of the fluid is below the lowest ORC operating temperature B, the action is to bypass the ORC evaporator 26 and run the heat transfer fluid through the secondary heat exchanger 27 without active cooling to allow the fluid's temperature to increase (i.e. close valve 28, open valve 29, close valve 30). If the temperature A of the fluid is within the ORC operating temperature range C, the action is to feed the fluid to the ORC evaporator 26 (i.e. open valve 28, close valve 29, close valve 30). If the temperature A of the fluid is above the highest ORC operating temperature D, the action is to once again bypass the ORC evaporator 26 and run the heat transfer fluid through the secondary heat exchanger 27 with active cooling to decrease the fluid's temperature (i.e. close valve 28, open valve 29, open valve 30).

Given the ORC's typical hot liquid resource operating range (from 90° C. to 150° C.), the choice of heat transfer liquid increases. Water may be used as the heat transfer fluid when operating with a maximum temperature below 100° C. However, water offers little margin for error in case of process temperature excursions: should the water temperature spike above the boiling point within conduits that are not pressure-rated, the resulting pressure increase (from the phase change) could damage equipment. Alternatively, fluids such as ethylene glycol, propylene glycol or thermal oils may be used. These fluids offer significant advantages over water including higher operating temperatures, decreased corrosion and lower electrical conductivity (especially important in the case of plasma torch cooling). At higher operating temperatures, the fluid requirements for optimal ORC operation decrease. In the operating temperature range for the ORC, these fluids have comparable viscosity to that of water, thus no special considerations are required with regards to pumping (though fluid preheating is recommended at startup). There is one minor disadvantage to using such alternate fluids instead of water: their heat capacity is typically lower than that of water, thus slightly decreasing the overall efficiency of the process. In order to address this shortcoming, several methods may be applied. The heat transfer properties can be improved by using mixtures of water and the thermal fluid (if the two fluids are miscible). Also, some additives can be added to the thermal fluid to improve its thermal properties (for example, adding nanoparticles has been demonstrated to increase the thermal conductivity of the resulting fluid—a nanofluid).

This method implicitly requires operating the various thermal components of the waste destruction system at higher-than-normal temperatures. As an illustrative example, for the ORC evaporator inlet temperature to be 150° C., the temperature of the fluid when cooling the thermal components (such as the plasma torch, the combustion chamber, etc.) will be in the order of 100° C. At such a high operating temperature, some precautions must be taken into consideration:

- in order to meet IMO regulations (if operating on a marine vessel), the thermal sections will have to be insulated in order to maintain the system's outer surface at a temperature of 60° C. or less. The heat transfer fluid reservoir must also be insulated appropriately (e.g.: using fiberglass insulation, etc.).
- seals, o-rings and other gasket material must be selected appropriately to ensure that they are rated for the higher operating temperature (e.g.: graphite gaskets, viton o-rings, etc.).
- in the case of plasma gasification, the various electrical insulators in the plasma torch need to be constructed from high temperature polymers such as, for example, PEEK or VESPEL™.
- no matter what the temperature of the heat transfer fluid, the material of construction of the liquid-cooled component must be chemically compatible with the heat transfer fluid selected. For example, untreated carbon steel would be an inappropriate material choice for water cooling, given that corrosion would occur (stainless steel would be a more appropriate choice). On the other hand, a thermal fluid with corrosion-inhibiting additives (such as the DowFrost™ propylene glycol mixture) would be appropriate for use with carbon steel.
- also, no matter what the temperature of the heat transfer fluid, the use of a heat resistant or high-temperature alloy liner (e.g.: Inconel, Hastelloy, etc.) is used inside the combustion chamber in order to extend the lifetime of that chamber's inner wall (which would be subjected to high temperature gradients and, consequently, uneven thermal expansion and contraction).

Figure 5:
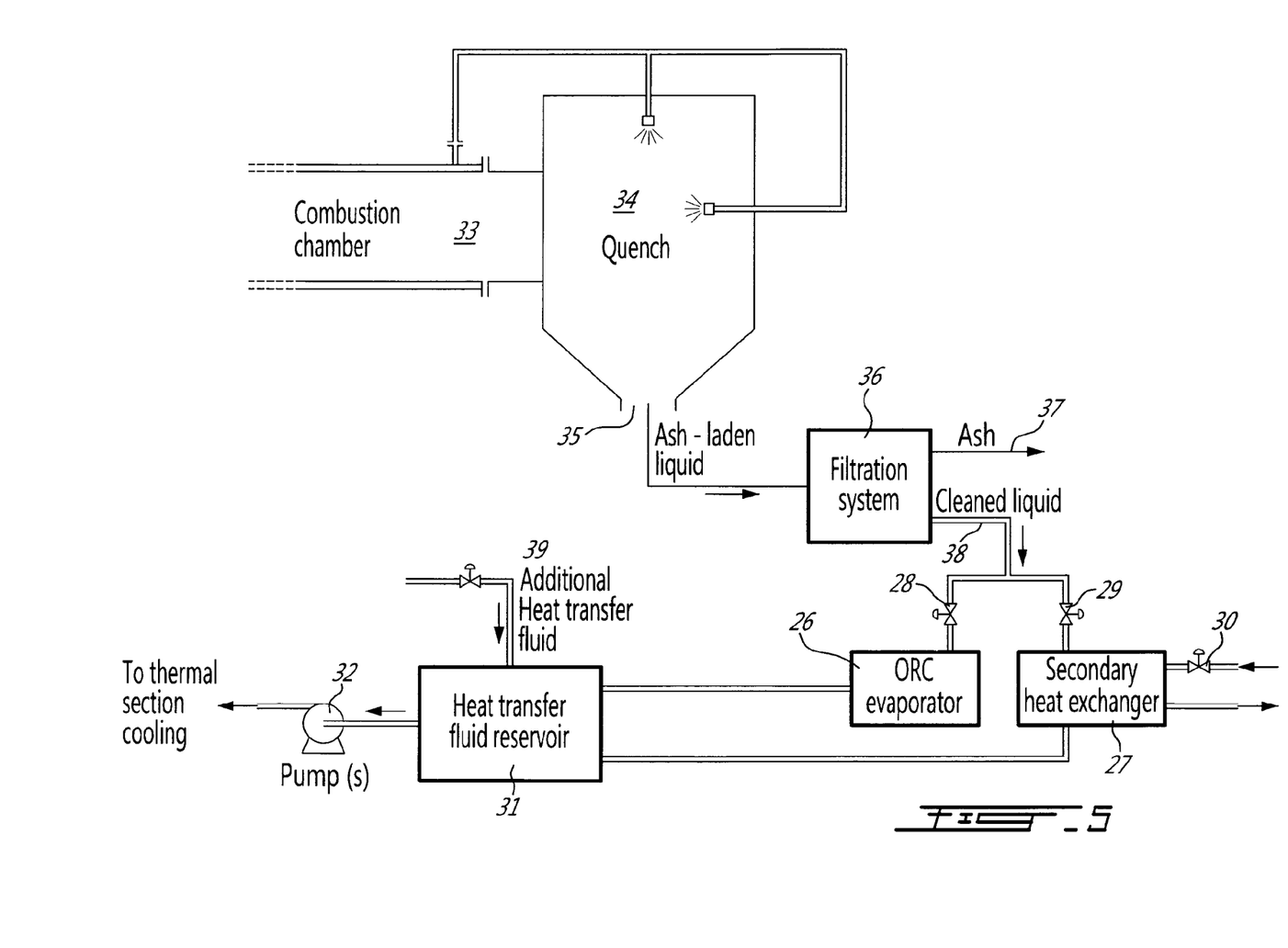
FIG. 5 is a schematic representation of a process in accordance with the present invention, and provided with a liquid quench.

This energy recovery method can be applied to a system in which a liquid quench is used to rapidly cool down the combustion chamber exhaust. A liquid quench is particularly important in cases where chlorinated plastics are combusted or gasified—processing such plastics can lead to the formation of toxic compounds (e.g.: dioxins, furans) if strict temperature control is not enforced. The application of this cooling method is illustrated in FIG. 5. Specifically, this alteration to the previously described method involves conveying a heat transfer fluid from a reservoir 31 using one or many pumps 32. The liquid is used to cool some or all of the previously described thermal sections, including a jacketed combustion chamber 33. The liquid is then fed to a quench 34, where it is sprayed through several nozzles in order to rapidly cool down the hot exhaust from the thermal section. The liquid 35, having entrapped the ash entrained from the combustion chamber 33, is fed to a filtration system 36 where the ash 37 is separated from the heat transfer fluid 38 to prevent fouling of the downstream components. This cleaned fluid 38, containing the thermal energy recovered from the process, is fed to the ORC evaporator 26 or to the secondary heat exchanger 27 depending on its temperature. The fluid then returns to the reservoir 31 and the cycle repeats. Additional heat transfer fluid may be added 39 to the reservoir 31 to make up for losses due to evaporation.

In an alternate configuration, the gas is quenched with fresh cold water to provide enough heat for adiabatic cooling of the gas. This fresh water is fed to the top of the quench through pressure nozzles. Additional water is used in a recycled loop using a recirculation pump, an inline filter, either a back flush strainer or a bag type filter, and a different set of nozzles in the quench. The filter is used to remove any entrained particulates from the gas stream that have been captured by the quench water. A Venturi separator can also be used downstream of the quench to remove additional particulates from the gas stream. In this case, part of the filtered recirculated water is also injected into the Venturi through a series of nozzles. The recirculated hot water can be used to heat the ORC fluid indirectly through a heat exchanger.

Therefore, in the present method, the majority of the wasted thermal energy, typically lost to cooling water, is recovered by cooling the process thermal sections with a higher temperature fluid, which can then be fed to an ORC unit for conversion to electrical energy.

Also, in the present method, the wasted thermal energy in the process is recovered by cooling of the various thermal components with a liquid (as just above) and by using this liquid to quench the hot process exhaust. Energy is recovered from this heated liquid following a filtration step to remove entrapped ash.

Furthermore, the present method involves operating the waste destruction system at a higher shell temperature to allow for the generation of a useful hot liquid resource. This method thus requires the modification and insulation of these components to meet regulatory needs.

Moreover, in the present control strategy, the temperature of the heat transfer fluid is monitored and the fluid is fed to the ORC evaporator system or to a secondary heat exchanger system based on whether or not the temperature of the fluid falls within the operating temperature of the ORC system. The heat transfer fluid can also be fed to the secondary heat exchanger should the ORC system fail for any reason. Thus, the waste destruction system can continue to operate without interruption even if the ORC is out of range or out of order.

In addition, while the method described is used to supply a hot liquid resource to the ORC unit for energy recovery in the form of electricity, it is not limited to use with the ORC. The hot liquid, containing the thermal energy recovered from heated parts of the waste destruction system, can be used as a resource for other surrounding processes. This method can also be used as a way of preheating water for use in a boiler, if the option of steam generation is retained (particularly in the case of larger scale systems). The heated water generated when the secondary heat exchanger is in use may also be used as a hot liquid resource for other process components or space heating requirements.

Although the present invention has been described hereinabove by way of embodiments thereof, it may be modified, without departing from the nature and teachings of the subject invention as described herein.

The invention claimed is:

1. A fossil fuel waste incineration or plasma gasification process, wherein waste heat generated by a combustion of waste is captured by a heat transfer fluid and conveyed to an Organic Rankine Cycle (ORC) for energy recovery, wherein the waste thermal energy in the process is recovered by cooling of the various thermal components with a liquid and by using the liquid to quench a hot process exhaust.

2. The process according to claim 1, wherein, in a fossil fuel-fired waste incineration system, the heat transfer fluid captures waste heat from a double-walled combustion chamber, a heat exchanger being used to cool the hot process exhaust (gas cooler).

3. The process according to claim 2, wherein the heat exchanger comprises a plate or a shell and tube configuration.

4. The process according to claim 1, wherein, in a plasma waste gasification system, the heat transfer fluid captures waste heat from at least one of a plasma torch, a gasification chamber cooling jacket and a combustion chamber cooling jacket, and a heat exchanger being then used to cool the hot process exhaust.

5. The process according to claim 4, wherein the heat transfer fluid further captures waste heat from any other high-temperature components requiring cooling.

6. The process according to claim 1, wherein the hot heat transfer fluid exits the exhaust heat exchanger and is fed to an Organic Rankine Cycle (ORC) evaporator, the thermal energy carried thereby being transferred to the refrigerant for conversion into electricity.

7. The process according to claim 1, wherein the hot heat transfer fluid is fed to a separate, secondary heat exchanger until an appropriate temperature has been reached for proper operation of the ORC or in case of a process and ORC unit malfunction.

8. A control strategy according to claim 7, wherein the temperature of the heat transfer fluid is monitored and the fluid is fed to the ORC evaporator system or to the secondary heat exchanger system based on whether or not the temperature of the fluid falls within an operating temperature of the ORC system, allowing the heat transfer fluid to be fed to the secondary heat exchanger in case of ORC system failure thus allowing the waste destruction system to continue operating without interruption.

9. The process according to claim 1, wherein energy is recovered from the heated liquid following a filtration step to remove any entrapped ash.

10. The process according to claim 1, wherein the waste thermal energy in the process is recovered by cooling of the various thermal components with a fluid and by using the fluid to indirectly cool the recirculated filtered quench water.

11. The A process according to claim 1, wherein the hot liquid, containing the thermal energy recovered from heated parts of the waste destruction system, can be used as a resource for other surrounding processes.

12. The A process according to claim 1, wherein the method is used as a way of preheating water for use in a boiler, if the option of steam generation is retained.

13. A fossil fuel waste incineration or plasma gasification process, wherein waste heat generated by a combustion of waste is captured by a heat transfer fluid and conveyed to an Organic Rankine Cycle (ORC) for energy recovery, wherein the waste thermal energy in the process is recovered by cooling of the various thermal components with a fluid and by using the fluid to indirectly cool the recirculated filtered quench water.

14. The process according to claim 13, wherein, in a fossil fuel-fired waste incineration system, the heat transfer fluid captures waste heat from a double-walled combustion chamber, a heat exchanger being used to cool the hot process exhaust (gas cooler).

15. The process according to claim 14, wherein the heat exchanger comprises a plate or a shell and tube configuration.

16. The process according to claim 13, wherein, in a plasma waste gasification system, the heat transfer fluid captures waste heat from at least one of a plasma torch, a gasification chamber cooling jacket and a combustion chamber cooling jacket, and a heat exchanger being then used to cool the hot process exhaust.

17. The process according to claim 16, wherein the heat transfer fluid further captures waste heat from any other high-temperature components requiring cooling.

18. The process according to claim 13, wherein the hot heat transfer fluid exits the exhaust heat exchanger and is fed to an Organic Rankine Cycle (ORC) evaporator, the thermal energy carried thereby being transferred to the refrigerant for conversion into electricity.

19. The process according to claim 13, wherein the hot heat transfer fluid is fed to a separate, secondary heat exchanger until an appropriate temperature has been reached for proper operation of the ORC or in case of a process and ORC unit malfunction.

20. A control strategy according to claim 19, wherein the temperature of the heat transfer fluid is monitored and the fluid is fed to the ORC evaporator system or to the secondary heat exchanger system based on whether or not the temperature of the fluid falls within an operating temperature of the ORC system, allowing the heat transfer fluid to be fed to the secondary heat exchanger in case of ORC system failure thus allowing the waste destruction system to continue operating without interruption.

* * * * *